June 21, 1949.    M. GAMBILL    2,474,145
WATER SOFTENER
Filed April 16, 1945    2 Sheets-Sheet 1
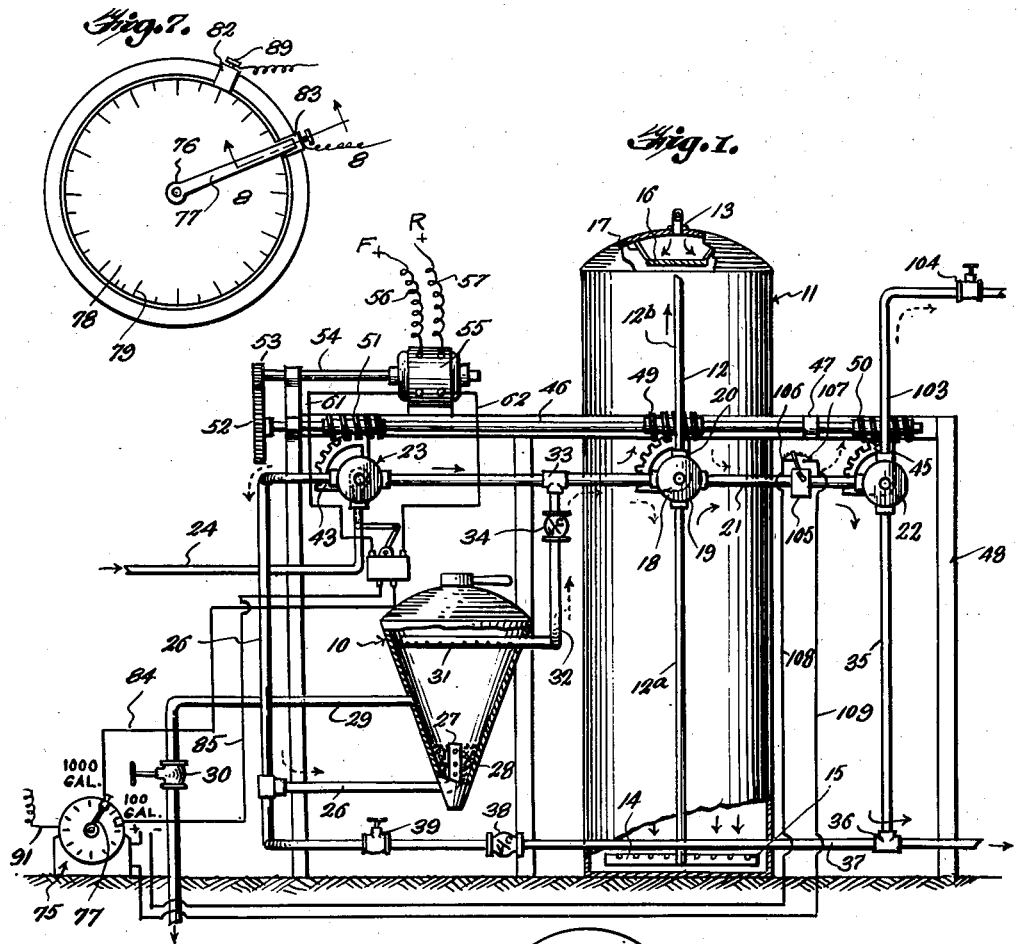
Inventor
MARVIN GAMBILL
By Kimmel & Crowell
Attorney

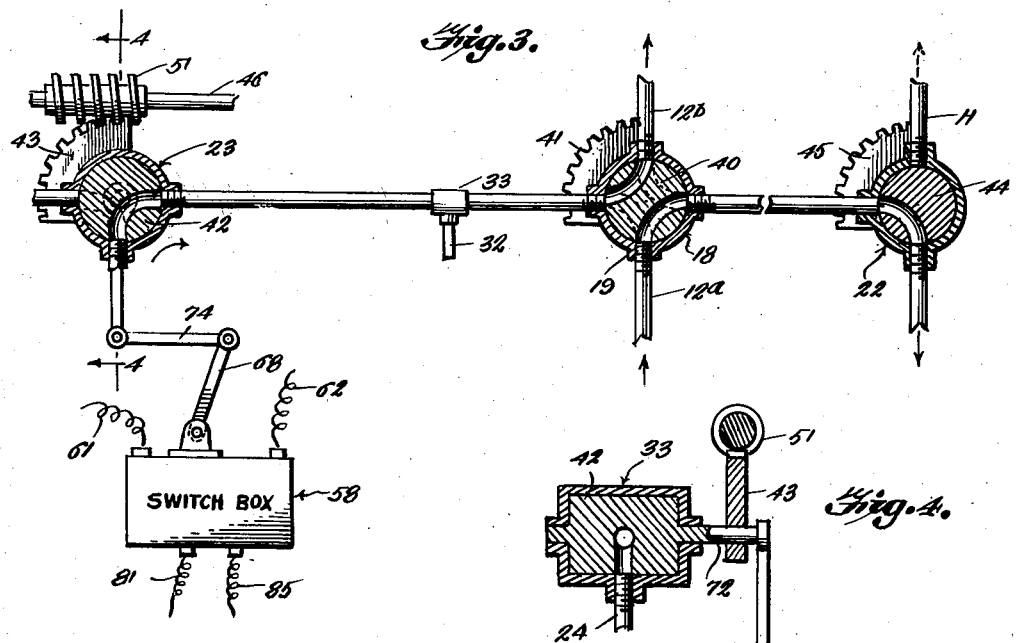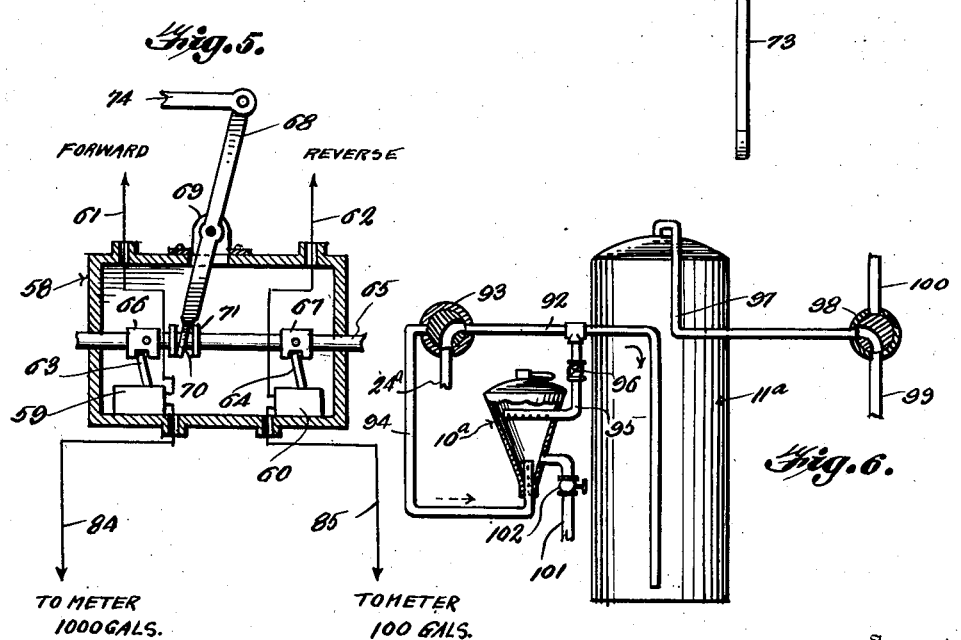

Patented June 21, 1949

2,474,145

UNITED STATES PATENT OFFICE 2,474,145

WATER SOFTENER

Marvin Gambill, Odessa, Tex.

Application April 16, 1945, Serial No. 588,633

7 Claims. (Cl. 210—24)

1

This invention relates to water softening apparatus.

An object of this invention is to provide a water softening apparatus or system which is automatic in its operation.

Another object of this invention is to provide an automatically operable water softening system which is cyclic in its operation to thereby provide at least one generating cycle after each operating cycle.

Another object of this invention is to provide an automatic water softening system wherein the periods of each cycle can be readily changed so that the water will be softened to the desired degree.

A further object of this invention is to provide a system of this kind embodying a time operated regulator connected to a reversible motor which controls the cycles of the system.

A further object of this invention is to provide a system of this kind which will readily operate on normal city water pressure.

In the drawings:

Figure 1 is a detail side elevation partly broken away and in section of a water softening system embodying this invention.

Figure 2 is a plan view of the system.

Figure 3 is a fragmentary vertical section taken on the line 3—3 of Figure 2.

Figure 4 is a sectional view taken on the line 4—4 of Figure 3.

Figure 5 is a vertical section taken through the motor switch box.

Figure 6 is a detail side elevation partly broken away and in section of a modified form of this invention.

Figure 7 is a detail front elevation of the cycle regulating dial.

Figure 8 is a fragmentary sectional view taken on the line 8—8 of Figure 7.

Referring to the drawings, the numeral 10 designates generally a brine tank and the numeral 11 designates generally a mineral tank, the two tanks being connected together as will be hereinafter described. A vertically disposed pipe 12 is connected at its upper end as at 13 to the top of mineral tank 11 for discharging water into the top of tank 11, and the lower end of pipe 12 is connected to the lower end of tank 11 for discharging water into the bottom of this tank. A crossed discharge member 14 provided with a plurality of discharge openings 15 is positioned in tank 11 at the bottom thereof for spreading the water or mineral in the bottom of tank 11. A baffle 16 is disposed in the top

2 of tank 11 being supported by supporting members 17 at a point spaced downwardly from the top of this tank, so that water discharged in the top of tank 11 through pipe 12$^b$ will strike this baffle and be distributed evenly about the sides of the tank.

A multiple valve 18 is interposed in pipe 12 being connected as at 19 and 20 to pipe 12 and preferably valve 18 is a four-way valve for directing the fluid either downwardly to the bottom of tank 11 or upwardly to the top of this tank. Valve 18 is also interposed in a horizontally disposed pipe 21, which at one end is connected to a three-way valve 22. A second three-way valve 23 is interposed in pipe 21 and has connected to one side thereof a supply pipe 24. Pipe 21 includes a right angularly disposed branch 25 and a vertical pipe 26 extends downwardly from the branch 25 and is connected by means of a pipe 26$^a$ to the lower end of brine tank 10. Brine tank 10 is constructed in the form of an inverted cone and pipe 26$^a$ is connected to a perforate distributing member 27 mounted in the lower end of tank 10. Tank 10 is adapted to contain a suitable water softening mineral, and preferably the lower portion of tank 10 has gravel 28 disposed therein and about the distributing member 27.

A drain pipe 29 is connected at one end to tank 10 above the lower end thereof and a valve 30 is interposed in drain pipe 29, so that tank 10 may be selectively drained. A perforated outlet member 31 is disposed in the upper portion of tank 10 and is connected to a pipe 32 which is also connected through connector 33 to pipe 21 between valves 18 and 23. An upwardly opening check valve 34 is interposed in pipe 32 for regulating the flow of fluid from tank 10 to pipe 21, or from pipe 21 to tank 10.

A pipe 35 is connected at one end to three-way valve 22, and at the other end to connector 36 which is interposed in a lower pipe 37. Pipe 37 is connected to pipe 26 and constitutes a service pipe through which the softened water flowing through pipe 35 is adapted to pass. A check valve 38 is interposed in pipe 37, opening towards the right, and a manually operable valve 39 is interposed in pipe 37 between check valve 38 and pipe 26. Valve 19 has connected to the plug 40 thereof a toothed quadrant 41 and valve 23 has secured to the plug 42 thereof a toothed quadrant 43. Valve 22 has connected to the plug 44 thereof a toothed quadrant 45, and the several valve members 19, 22 and 23 are adapted to have the plugs thereof rotated by means of a shaft 46 journalled in bearings 47 carried by a supporting frame structure 48.

A worm 49 is fixed on shaft 46 and meshes with quadrant 41 and a second worm 50 is also fixed on shaft 46 and meshes with quadrant 45. A third worm 51 is also fixed on shaft 46 and meshes with quadrant 43. A spur gear 52 is fixed on one end of shaft 46 and meshes with a reduction gear 53 carried by a motor shaft 54. A reversible motor 55 is connected to shaft 54 and is adapted to rotate valve regulating shaft 46 for moving the several valve members to selected fluid controlling position. The motor 55 has a wire 56 connected to one side thereof for rotating the motor in a forward direction and has a wire 57 connected thereto for rotating the motor in a reverse direction. The wires 56 and 57 are connected to one side of a source of current supply. A switch or housing generally designated as 58 is supported in a position adjacent valve 23, and has mounted therein a pair of conventional switch members 59 and 60. Switch member 59 is connected by means of a wire 61 to the forward side of motor 55 and switch member 60 is connected by means of a wire 62 to the reverse side of motor 55. The switches 59 and 60 are snap switches and each includes a switch operating lever 63 and 64 respectively. The switches 59 and 60 are simultaneously operated one to a circuit closing position and the other to a circuit breaking position by means of a slidable rod 65 carried by the housing or switch box 58.

The rod 65 has secured thereto a pair of slotted members 66 and 67 which are engageable with the switch arms or levers 63 and 64 respectively, so that when rod 65 is moved in one direction the switches will be simultaneously operated. Rod 65 is actuated by means of a rock lever 68 carried by bearings 69 supported from housing 58. Lever 68 has a forked lower end 70, engaging between a pair of collars 71 secured to rod 65.

Valve plug 42 has secured to the stem 72 thereof a depending lever 73 and lever 73 is connected to lever 68 by means of a link 74. As shown in Figure 5 switch 59 is in a circuit closing position for operating motor 55 in a forward direction, whereas switch 60 is in a circuit breaking position. Motor 55 is timed in its forward and reverse operation by means of a clock switch structure generally designated as 75. The clock switch structure 75 may be either a spring or electric motor operated switch structure and includes a shaft 76, having a swinging arm 77 secured thereto. Arm 77 swings across the face of a dial 78 which is formed with graduations or indicia 79 and dial 78 has secured thereto a pair of annular contact rings 80 and 81.

A pair of adjustable contacts 82 and 83 are carried by the outer margin of dial 78 and contacts 82 and 83 are connected by means of wires 84 and 85 to switches 59 and 60 respectively. Contacts 82 and 83 are of like construction, being shown in detail in Figure 8 and each includes a U-shaped member engaging over the marginal edge of the dial 78 and formed with inturned flanges 86.

A contact adjusting screw 88 is threaded through the bight of contact member 83 and engages with contact ring 81. Contact member 82 has an adjusting screw 89 threaded through the bight thereof which is engageable with contact ring 80. Arm 77 has secured thereto a wiper 90 which is adapted to wipe over contacts 82 and 83 upon rotation of shaft 76 and arm 77 is electrically connected to the opposite side of the supply source by means of a wire 91. The spacing between contacts 82 and 83 will determine the lengths of the operating and regenerating cycles of the apparatus.

Referring now to Figure 6 there is disclosed a modified form of this water softening system, which includes a brine tank $10^a$ and a mineral tank $11^a$. A pipe 92 is connected at one end to the lower portion of tank $11^a$ and connected at the other end to a three-way valve 93. A supply pipe $24^a$ is connected to one side of valve 93 and a second pipe 94 is connected at one end to valve 93 and at the other end to the lower portion of brine tank $10^a$. Brine tank $10^a$ has one end of a pipe 95 connected to the upper portion thereof, and the other end of pipe 95 is connected to pipe 92 between valve 93 and the lower end of tank $11^a$. An upwardly opening check valve 96 is interposed in pipe 95 so that when pipe 92 is in communication through valve 93 with supply pipe $24^a$, the water will not flow into tank $10^a$.

An outlet pipe 97 is connected at one end to the top of mineral tank $11^a$ and at the other end is connected to a three-way valve 98. A pipe 99 which constitutes a service pipe is connected to valve 98, and a pipe 100 is also connected to valve 98 and constitutes a drain pipe. Tank $10^a$ has connected to the lower portion thereof a drain pipe 101, having a valve 102 interposed therein.

In the use and operation of this water softening system the mineral tank 11 is filled with a water softening fluid by initially turning valve 23 in a clockwise direction so that plug 42 will communicate supply pipe 24 with pipe 26. At the same time that pipe 26 is in communication with supply pipe 24 plug 40 of valve 19 is rotated to a position communicating pipe 32 through pipe 21 with the lower branch $12^a$ of pipe 12. The liquid will then flow through distributing member 14 in the bottom of tank 11 and will be discharged from the top of tank 11 through upper branch $12^b$, which at this time is in communication with pipe 21 between valves 19 and 22. At this time also valve 22 will have the plug thereof communicating pipe 21 with discharge pipe 103. After tank 11 has been in communication with tank 104 a predetermined period of time, the time being regulated by the space between contact members 82 and 83, tank 10 will be cut off from supply line 24 and from tank 11.

When swinging contact or switch arm 77 engages contact 83 motor 55 will be operated in a reverse direction thereby rotating valve plugs 40, 42 and 44 in a counterclockwise direction to the full line positions shown in Figure 3. The water will then flow from supply line 24 through valve 23 directly into pipe 21, check valve 34 being closed, and the water will flow into valve 18 and upwardly into branch $12^b$. The water is then discharged into the top of tank 11 and is exhausted from tank 11, from distributor 14, through pipe branch $12^a$. The water from branch $12^a$ will then flow to the right through that portion of pipe 21 between valves 18 and 22, and as at this time valve 22 is in a position communicating pipe 21 with pipe 35 the softened water will flow downwardly through pipe 25 and into pipe 37, the latter being the service pipe. The operating or service cycle is a longer cycle than the regenerating cycle, the length of these two cycles being determined by the relative positions of contacts 82 and 83.

Clock 75 which may be either a spring or electric clock will rotate moving switch or contact arm 77 at a predetermined rate, so that the gallonage passing through the system for each cycle can be readily and accurately calculated in order to provide for the desired softening of the water which passes through mineral tank 11. As viewed in Figures 1 and 7 switch arm 77 is rotated in a clockwise direction by the motor 75 and the space between contacts 82 and 83 constitutes the regenerating cycle or period. The space between contacts 83 and 82 in a clockwise direction is the operating or service cycle and is normally a longer space than the regenerating cycle.

If it is desired to by-pass the brine and mineral tanks, valves 18, 22 and 23 are adjusted to their regenerating positions and valve 39 in pipe 37 is opened. A valve 104 which is interposed in pipe 103 may be closed so that mineralized water from the top of tank 11 will not be permitted to discharge through pipe 103. When valve 39, which is a manual valve, is opened the water pressure will force check valve 38 open so that unsoftened water will be permitted to flow through pipe 37 to the service device.

In order to provide a means whereby the clock 75 may be regulated in its operation according to the quantity or pressure of water passing through the pipe 21, I have provided a spring placed check valve 105 which is interposed in the pipe 21. The check valve 105 is normally biased to a closed position and has connected thereto a movable switch arm 106, which is adapted to wipe over a resistance 107. A conductor 108 is connected at one end to the resistance 107 and at the other end is connected to one side of the supply source for the clock 75. A second conductor 109 is connected at one end to the switch arm 106 and at the other end is connected to one side of the electric clock 75. When the pressure passing through pipe 21 is normal check valve 105 will be moved to an open position and at this time switch arm 106 will be at the end of the resistance 107 with which conductor 108 is connected, so that clock 75 will operate under normal load. However, in the event the pressure in pipe 21 becomes reduced, valve 105 will partially close the line 21 and switch arm 106 will move across resistance 107 proportionately. At the same time a reduced amount of current will pass from conductor 108 through resistance 107 to conductor 109 and to clock 75 in order that clock 75 will operate slower when the water pressure is reduced and the water flow is below normal. In this manner the system will operate for predetermined quantities of water during the several cycles thereof and the amount of water passing through the system will be substantially the same at all times.

What I claim is:

1. In water softening apparatus comprising a mineral tank, a brine tank, a pipe communicating with the upper and lower ends of said mineral tank, a multiple valve interposed in said pipe whereby fluid may be directed into and from a selected end of said mineral tank, an inlet pipe connected at one end to one side of said valve and at the other end to said brine tank adjacent the bottom of the latter, a second multiple valve interposed in said inlet pipe, a supply pipe connected to one side of said second valve, a pipe bridging one end of said brine tank to said inlet pipe between said first and second valves, a check valve in said bridging pipe opening in the direction of said inlet pipe, a fluid discharge pipe connected to said first valve, a third multiple valve connected to said fluid discharge pipe, and a common operator for said multiple valves operatively connected thereto for moving all of said multiple valves at the same time.

2. Water softening apparatus comprising a mineral tank, a brine tank, a pipe communicating with the upper and lower ends of said mineral tank, a multiple valve interposed in said pipe whereby fluid may be directed into and from a selected end of said mineral tank, an inlet pipe connected at one end to one side of said valve and at the other end to said brine tank adjacent the bottom of the latter, a second multiple valve interposed in said inlet pipe, a supply pipe connected to one side of said second valve, a pipe connecting said brine tank to said inlet pipe between said first mentioned and second mentioned valves, a check valve in said last named pipe opening in the direction of said inlet pipe, a fluid discharge pipe connected to said first mentioned valve, a third multiple valve connected to said fluid discharge pipe, a vertical pipe connected between its ends to said fluid discharge pipe a common operator operatively connected to said multiple valves for moving all of said multiple valves at the same time, and a reversible motor operatively connected to said operator for controlling said valves.

3. Water softening apparatus comprising a mineral tank, a brine tank, a pipe communicating with the upper and lower ends of said mineral tank, a multiple valve interposed in said pipe whereby fluid may be directed into and from a selected end of said mineral tank, an inlet pipe connected at one end to one side of said valve and at the other end to said brine tank adjacent the bottom thereof, a second multiple valve interposed in said inlet pipe, a supply pipe connected to one side of said second multiple valve, a pipe connecting said brine tank to said inlet pipe between said first and second valves, a check valve in said last named pipe opening in the direction of said inlet pipe, a fluid discharge pipe connected to said first valve, a third multiple valve connected to said fluid discharge pipe, a vertical pipe connected to said latter valve and a valve adjusting means operatively connected to said multiple valves for moving all of the valves at the same time.

4. Water softening apparatus comprising a mineral tank, a brine tank, a pipe communicating with the upper and lower ends of said mineral tank, a multiple valve interposed in said pipe whereby liquid may be directed into and from a selected end of said mineral tank, an inlet pipe connected at one end to one side of said valve and at the other end to said brine tank adjacent the bottom of the latter, a second multiple valve interposed in said inlet pipe, a supply pipe connected to one side of said second valve, a pipe connecting said brine tank to said inlet pipe between said first and second valves, a check valve in said last named pipe opening in the direction of said second pipe, a third discharge pipe connected to said first valve, a third multiple valve connected to said fluid discharge pipe, a vertical pipe connected to said third valve, and a valve operating means operatively connected to said multiple valve for moving all of the valves at the same time.

5. Water softening apparatus comprising a mineral tank, a brine tank, a pipe connecting the upper and lower ends of said mineral tank, a selector valve intermediate the length of said pipe, an inlet pipe and a discharge pipe connected to said valve whereby the opposite ends of said first pipe may be selectively connected to said inlet and discharge pipes, a second selector valve on said inlet pipe, a brine tank outlet pipe connecting the brine tank to said inlet pipe between said valves, a fluid supply pipe connected to said second valve, a service pipe connected to said second valve, said second valve operable for selectively connecting said supply pipe to said inlet pipe and said service pipe, a shut-off valve in said service pipe, a brine tank inlet pipe connected to said inlet pipe between said shut-off valve and said second valve, a third selector valve on said discharge pipe, a pipe between said third valve and said service pipe, a second discharge pipe connected to said third selector valve for selectively connecting said first discharge pipe to said second discharge pipe and said service pipe, a common operator operatively connected to said selector valves, and means connected to said common operator for actuating said selector valves from one position to the other at predetermined selected intervals.

6. Water softening apparatus as set forth in claim 5, wherein the supply fluid is directed through said brine tank, said mineral tank, and said discharge pipes in one position of said selector valves and the supply fluid is directed through said mineral tank and said service pipe in another position of said selector valves.

7. Water softening apparatus as set forth in claim 6, including shut-off valves carried by said service pipe and one of said discharge pipes for connecting said supply pipe to said service pipe by passing said mineral and brine tanks.

MARVIN GAMBILL.

REFERENCES CITED

The following references are of record in the file of this patent:

UNITED STATES PATENTS

| Number | Name | Date |
|---|---|---|
| 1,528,654 | Cancienne | Mar. 3, 1925 |
| 1,625,197 | Eisenhauer | Apr. 19, 1927 |
| 1,661,676 | Norquist | Mar. 6, 1928 |
| 1,674,717 | Eisenhauer | June 26, 1928 |
| 1,933,628 | Huppertz | Dec. 12, 1933 |
| 1,990,722 | Bashioum | Feb. 12, 1935 |
| 2,003,739 | Clark | June 4, 1935 |
| 2,012,194 | Hughes | Aug. 20, 1935 |
| 2,050,614 | Kerr | Apr. 11, 1936 |
| 2,203,040 | Bassett, Jr. | June 4, 1940 |
| 2,338,667 | Riche | Jan. 4, 1944 |
| 2,407,539 | Daniels | Sept. 10, 1946 |